Figure 1:
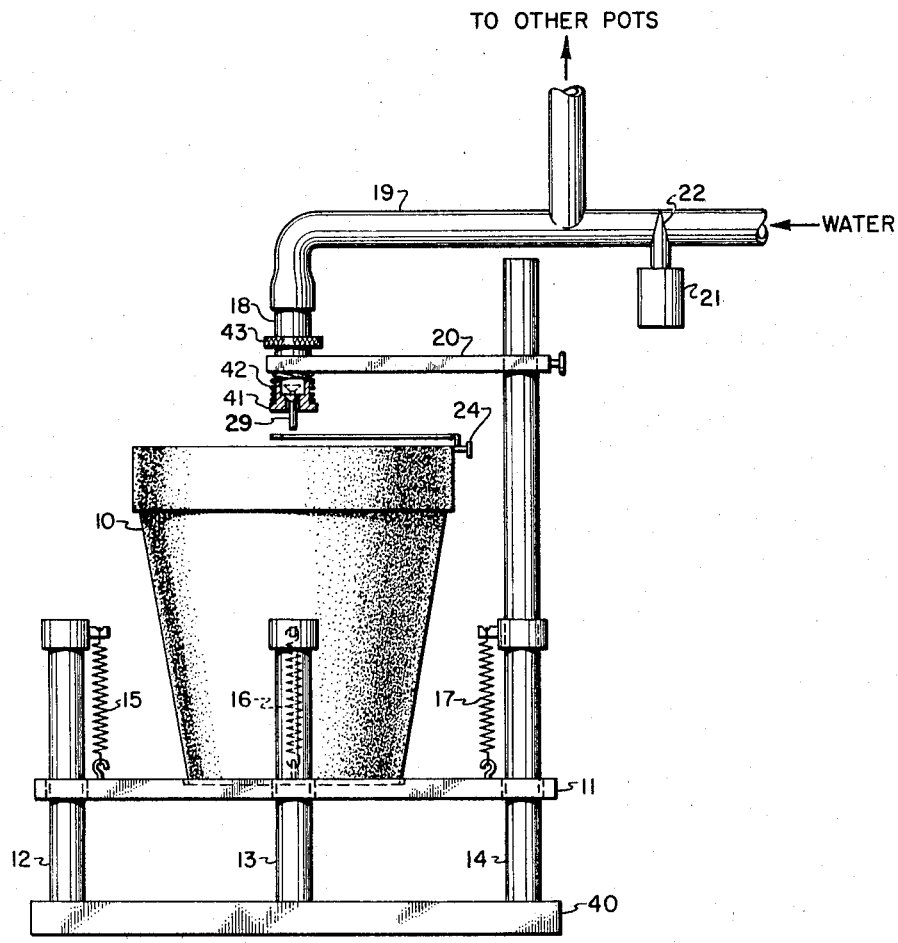

Dec. 27, 1966  G. F. KELLER ETAL  3,293,799
AUTOMATIC IRRIGATION OF POT CULTURES IN
PLANT GROWTH ROOMS AND GREENHOUSES
Filed Feb. 4, 1964

GEORGE F. KELLER, KAMIL SOR
HARLAN M. SMITH, JACK D. DE MENT  Inventors

By W. O. T. Heilman

Patent Attorney

A COMPARISON BETWEEN AUTOMATIC AND MANUAL IRRIGATION SYSTEMS IN
WATERING CROPS GROWN UNDER CONTROLLED CLIMATIC CONDITIONS

United States Patent Office 3,293,799
Patented Dec. 27, 1966

3,293,799
AUTOMATIC IRRIGATION OF POT CULTURES IN PLANT GROWTH ROOMS AND GREENHOUSES
George F. Keller, Ridgefield, Kamil Sor, Linden, Harlan M. Smith, Fanwood, and Jack D. De Ment, Springfield, N.J., assignors to Esso Research and Engineering Company, a corporation of Delaware
Filed Feb. 4, 1964, Ser. No. 342,442
8 Claims. (Cl. 47—38)

The present invention is broadly concerned with an automatic system or technique and apparatus for providing a predetermined quantity of moisture to pot cultures and the like so as to maintain a constant amount of moisture in the soil. The invention is more particularly concerned with a technique and apparatus for providing the necessary amount of control moisture to plants, ferns and other agricultural greenhouse products. In accordance with one specific adaptation of the invention, an apparatus is provided whereby the pot or holder containing the plant or vegetation growth is placed upon a scale or balance or equivalent means. Thus as the moisture evaporates or is otherwise consumed, the total weight of the container will become less thereby allowing the pot to be raised by means of springs or equivalent means which triggers a watering system comprising a unique combination of apparatus elements. The apparatus in essence is an integrated combination system which comprises a cam timer, a value actuator and a balance system.

In many growth chambers and greenhouses and the like, particularly in these endeavors involving basic research, it is absolutely essential to precisely control the amount of soil moisture present which is necessary for the growth of the plant. Presently to achieve this control, it is necessary to weigh each pot or container individually in order to determine how much water should be added to bring the moisture content of the soil up to the desired level. This must be done once or twice or more times a day, and must be continued without interruption every day throughout the period of the plant growths or the periods of the test observations. When the weighings and water addition measurements are done by hand and particularly when a large number of pots or containers are involved, the procedure becomes very time-consuming. Under these conditions the possibility of error is greatly enhanced which will directly and adversely affect the accuracy of the conclusions reached. Thus the degree to which the moisture content is not precisely controlled and measured will directly interfere with research efforts. Also, research flexibilities and capacities are restricted and limited by the problems and difficulties of scheduling the irrigations and measurements. This will greatly increase the expenses and costs of productive research in the agriculture field. Thus as pointed out heretofore the present invention is concerned with an automatic irrigation system for experimental pot cultures.

Thus as pointed out the irrigation of flowers, garden crops, pot cultures and the like in plant growth research rooms, greenhouses and the like to secure climatically controlled and measured conditions is a time-consuming and expensive practice. The water requirements of plants or cultures are a function among other factors of the rate of evaporation and evapotranspiration of the environment which varies with respect to climatic conditions, types of soil and plants, and the age of the plant culture or vines. The water requirements to be added to each pot are determined by weighing each pot manually. Water is added to each pot until the moisture content of the soil reaches field capacity or an amount which has been predetermined in order to conduct a particular research project.

In the past, two general types of automatic irrigators have been used. In one type, water is added to the pot from a manifold supplied through a central water valve which is periodically opened by an electric relay-solenoid system. In this method all pot containers tend to receive about the same amount of water. This obviously leads to unacceptable differences in the soil moisture contents in the different pots for reasons heretofore given.

Another technique previously utilized for the self-irrigation of pots in greenhouses and the like is to use a tensiometer device. In this system a porous cylinder is sealed onto a tube which is inserted into a reservoir of water at a lower level. When the moisture in the soil is in equilibrium with the water in the cup, the soil moisture tension of the soil is equal to the hydraulic head difference between the porous cup and the water level in the reservoir. This system may be used satisfactorily at soil moisture contents close to saturation. By the application of vacuum this method may also be used for soil moisture tensions less than about 0.8 atmosphere. However, since in this system the porous cylinder must be placed in the soil in the pot, undesirable influences on the experiment are introduced.

Figure 2:
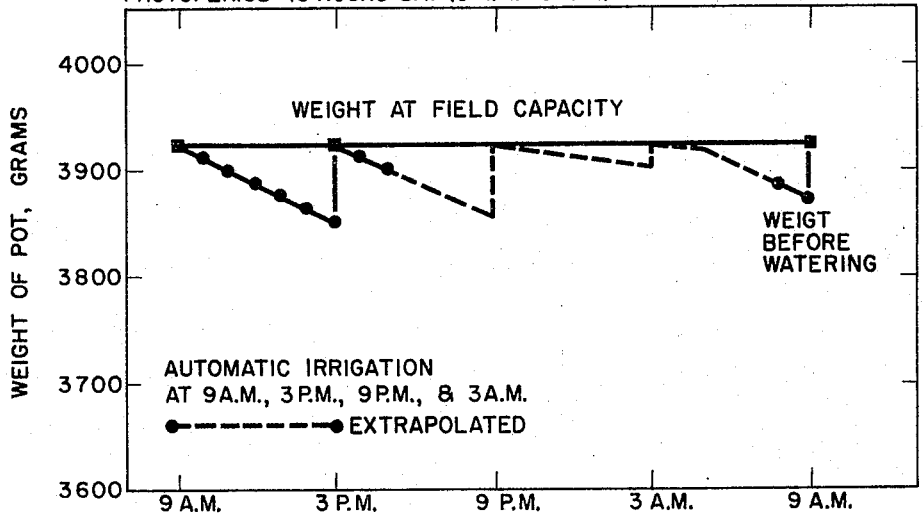
Figure 2:
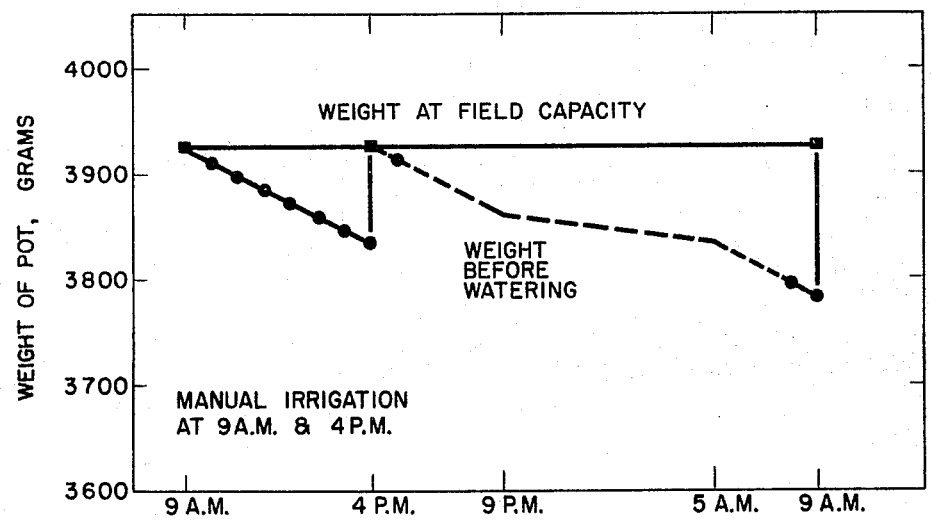
Figure 3:
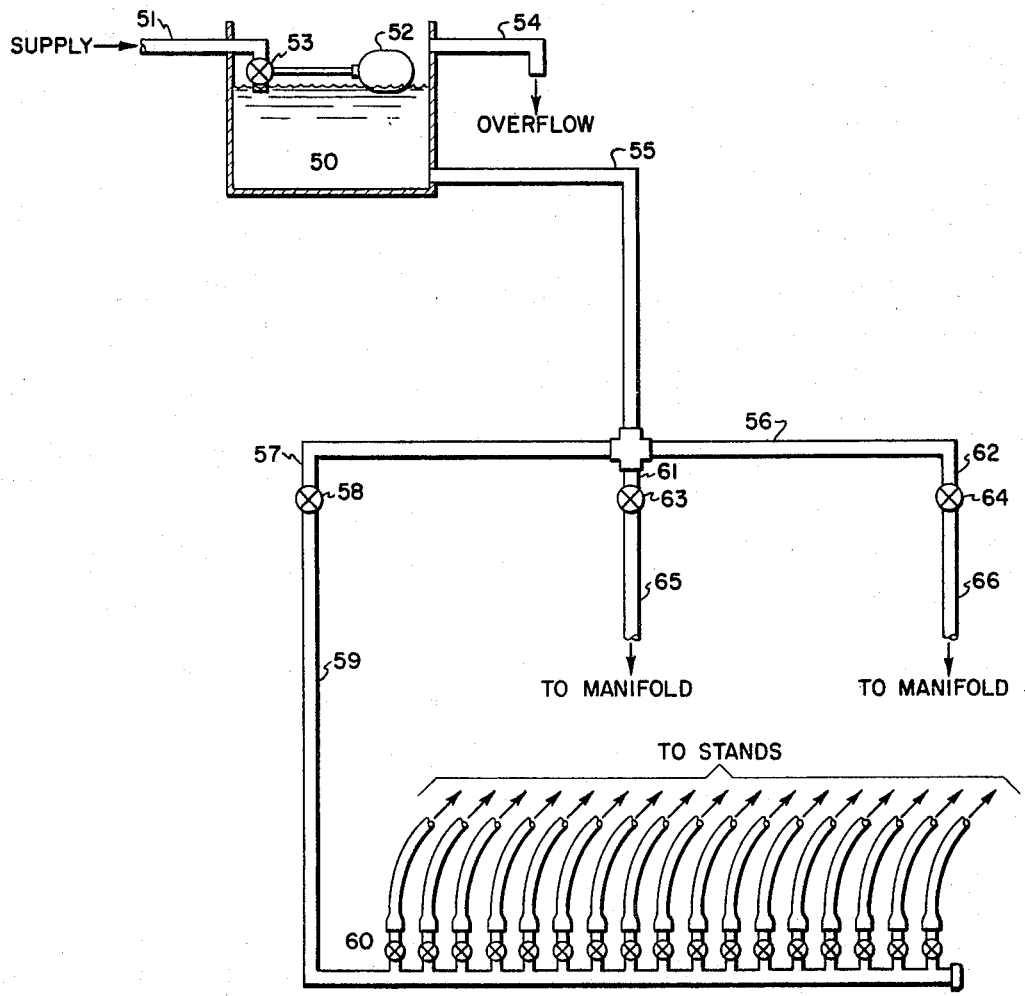

The present invention may be more readily understood by reference to the figures illustrating some embodiments of the same. FIG. 1 illustrates one type of apparatus used while FIG. 2 illustrates the high degree and excellent results secured by automatic irrigation of the present invention as compared to manual irrigation. FIG. 3 schematically illustrates an adaptation of the present invention utilizing floats and illustrating a plurality of manifolds.

Referring specifically to FIG. 1, a pot or container 10, filled with a known quantity of soil at a given moisture content (usually some desired percentage of field capacity) is placed on the bottom plate 11. Container 10 also contains a culture which for the sake of simplicity is not shown. Bottom plate 11 is attached to upright rods or posts 12, 13 and 14 by means of suspension springs 15, 16 and 17. These upright or vertical rods or posts 12, 13 and 14 are rigidly affixed to a weight stand 40 which is of sufficient weight and strength to support the entire assembly. The number of posts may be varied as required and may be in the range from about 2 to 6 or more. The springs tend to raise plate 11 while the mass of the container including the moisture tends to lower the plate against the thrust of the springs.

A nozzle 18 is attached by means of holder 20 to post 14. This nozzle valve 18 is suspended at the end of a tubing or conduit member 19 which may be Tygon tubing or an equivalent conduit through which water passes. A conventional cam timer 21 controls the flow of water from a water source through tubing 19. This cam timer 21 is set so that it will function at periodic set intervals, activating a valve 22 permitting water to flow into and through conduit 19. The timer 21 and valve element 22 are diagrammatically illustrated since many types exist which are satisfactory. The activation of valve 22 by means of timer 21 may be induced either electrically or by a fluid such as air bellows type of action. The duration of the on or open period for valve 22, for example, may be set in the range from 5 to 20 minutes but in the particular tests was set at 9 minutes which was more than enough to supply required moisture to the soil.

Due to the evapotranspiration, the weight of the pot decreases with time. This decrease in weight will cause the pot to move upwardly due to the pulling forces of the springs. This upward movement in turn pushes the needle valve arm or activator 24 which functions to move needle 29 upwardly from shoulder 41 against the downward thrust of spring 42, thus permitting fluid to flow into the pot. A vernier adjustment 43 is provided so as to secure the correct position of needle 29 with respect to valve actuator 24. Thus, when the cam timer opens valve 22 water will flow through conduit 19, through valve 18 onto the soil surface of the pot until the weight of the pot reaches the pre-set weight. When this occurs, the valve actuator 24 no longer lifts the needle valve and it closes, thereby shutting off the flow of water to the container. At the end of 9 minutes or any other set period, the cam timer goes off and closes the water line completely until the next opening period of the cam timer. It is obvious that one cam timer assembly may be utilized to operate a large number of pots, as for example attached to conduit 25 at the same watering frequency, each pot getting just the amount of water it needs since each pot is serviced by a nozzle valve as described.

Reference is made to FIG. 2 wherein a comparison is made between the automatic irrigation of the present invention and manual irrigation in watering crops grown in pots under controlled climatic conditions. The soil used was a sassafras sandy loam and the crop was a grass. The soil at field capacity with tare was 3930 g.

Reference is made to FIG. 3 wherein water is supplied to an overhead reservoir 50 by means of line 51. The amount of water supplied to 50 is controlled by a float 52 controlling a valve 53 in line 51 by conventional means. An overflow 54 to a drain is provided to avoid flooding. A line or conduit 55 is connected to manifold 56. A line 57 extends to a solenoid or equivalent valve 58 operating as hereinbefore described. Line 59 extends from valve 58 to a plurality of cultures in container 60, each of which controls a needle or equivalent valve as hereinbefore described. Lines 61 and 62 extend to solenoid or equivalent valves 63 and 64, and lines 65 and 66 extend to other manifolds of cultures such as described with respect to 60. By this technique, a plurality of cultures in a series-parallel relationship are serviced. Furthermore, by adjusting the height of reservoir 50 the desired consistent hydraulic head is secured on the valves in operation, thereby securing the desired flow rates. Also, if one solenoid valve should incur difficulty, it would not affect the research results of the plurality as cultures serviced by valves 63 and 64.

Thus in essence, the invention comprises the utilization of a suspended bottom or base plate on which is positioned a container holding the culture, the soil and moisture. This bottom plate in one embodiment is so positioned and supported that it is adapted to be moved vertically with respect to a first nozzle. The vertical movement of the plate is activated by the addition and by the evapotranspiration of fluid in the container. This vertical movement of the plate secured by the means illustrated is adapted to open and close the said first valve.

While the vertical movement with respect to FIG. 1 is secured by supporting the plate with springs in tension, it is to be understood that other means of supporting said plate may be utilized as, for example, by having springs in compression underneath the plate or by other flexible or elastic means. These means which support the plate in a manner to permit its vertical movement with respect to the valve if the moisture content in the container varies may be of any suitable type or structure.

The proposed irrigation system is found to be suitable to all sizes of pots used in growth rooms and greenhouses. The only difference between operation with small pots less than 2 kilograms and big pots, that is for example 2 to 5 kilograms, is a choice of spring sizes. In the operation studies carried out, it is found that for pots filled with 500 grams of oven-dried soil, a spring rate of 0.833 pound per inch and for pots filled with 3 kilograms of soil, a spring rate of 2.83 pounds per inch was very satisfactory.

The automatic irrigator of the present invention has been found to be usable under certain conditions without a cam timer. In this case the water simply dribbled into the pot as evapotranspiration occurs keeping the pot weight always at the pre-set value. This can be done at times with loam or heavier textured soil in small pots. In sandy soils and in pots larger than about 5 inches in diameter, water coming from the nozzle valve in this action was not able to keep the whole soil surface wet, which is very desirable. The outer portions of the soil surface were drier than the portions of the soil surface near the nozzle.

The needle or equivalent valve at the culture container working in combination with the solenoid or equivalent valve as described functions to avoid continuous seepage or dribbling of moisture into the pot which would be the case if only the needle valve were used. By the technique described, periods of simulated raining and dry periods are secured even though the needle valve is open. Also, by supplying the water or moisture in a relatively large amount, better distribution of the water is secured under the soil particularly when sandy soil is used.

Thus the present invention is concerned with an apparatus wherein a pot or container is positioned on a spring-actuated plate or holder in combination with a needle or equivalent valve and in combination with a cam timed valve or equivalent and is so designed to provide the necessary moisture in simulated rainfall to each pot. In operation, the cam timer is set to open, for example, two to four or more times a day and, when this coincides with the opening of the needle valve, the moisture will be supplied to that pot until the moisture content is such as to cause the plate to move downwardly, thereby closing the needle valve even though the cam timer valve is still open. Thus every pot will secure the desired amount of moisture it requires and the assembly will shut off excess water automatically. At the same time, the valves at the culture will not be subjected to excess water pressure since the cam timer valve will cut off the water in the main conduit, thereby releasing pressure on the needle valves until the moisture is actually required in the container.

The type of valves used may be varied appreciably. While a needle valve is preferred at the container since it is of a very simple construction, other types of valves may be used. In operation, the plunger 29 is simply moved upwardly by actuator 24, use of its seat 28 thereby permitting the flow of water into the pot. The solenoid valve used is one of the type which is normally closed. The valve is actuated by a solenoid which in turn is actuated by the cam timer. A typical solenoid valve is one described in the General Catalog V-60 of the Skinner Electric Valve Division, of New Britain, Connecticut, and is designated as Skinner No. V52DB3007, page 3.2. The synchronous motor driven cam timer also may be of varied structure. A satisfactory timer is one described in Bulletin No. 200 of the Industrial Timer Corporation, located 1407 McCarter Highway, Newark 4, New Jersey. A satisfactory timer is one described as Model CM-12.

What is claimed is:

1. An apparatus for holding a container suitable for holding soil, a culture, and fluid and for automatically supplying fluid to said container comprising: a base plate; a plurality of posts extending upwardly from said base plate, including at least one elongated post that is longer than the other posts; a support plate for holding said container, said support plate slidably mounted to said posts to be guided in the vertical plane as the support plate moves in vertical relative movement to said base plate; spring bias means attached to at least a majority of said posts and to said support plate to initiate upward vertical movement in response to a decrease in the weight of a predetermined amount of fluid to be placed in said container; a valve positioned above said support plate to permit flow of fluid into said container when fluid is passing through said valve, said valve being suitable for connection to a fluid supply conduit; actuating means adapted to open said valve in response to said upward vertical movement of said support plate; and an elongated member supporting said valve and slidably mounted to said elongated post to permit coarse adjustment of the distance between said valve and said base plate.

2. An apparatus according to claim 1 including vernier adjustment means operatively connected to said valve to permit fine adjustment of the distance between said valve and said base plate.

3. An apparatus for automatically simulating periods of rain and dry spells to a container that is suitable for holding soil, a culture and fluid comprising: a first valve being suitable for connection to a fluid supply conduit; supporting means for maintaining said container in a position relative to said first valve to insure that fluid will flow into said container when the fluid has passed through said first valve; sensing means including said first valve to detect a change in weight of said container resulting from a change in the weight of fluid contained therein; actuating means adapted to open said first valve in response to a decrease in the weight of moisture detected by said sensing means; a second valve for connection in series with said first valve in said fluid conduit; and a timer assembly operatively connected to said second valve to open said second valve for predetermined intervals at predetermined times, said timer assembly thereby simulating rainy and dry periods rather than permitting continuous seepage.

4. Apparatus for holding a container and automatically supplying fluid to said container comprising: base means, support means for holding said container; spring bias means for mounting said support means relative to said base means and permitting vertical relative movement therebetween; a first valve mounted from said base means and positioned vertically above said container to be placed upon said support means, said valve being suitable for connection to a fluid supply conduit and actuating means adapted to open said valve in response to vertical movement of said support means, whereby fluid flows into said container in response to upward vertical movement of said support means to thereby maintain a substantially predetermined amount of fluid in said container; a second valve for connection in series with said first valve in said fluid conduit; and a timer assembly operatively connected to said second valve to open said second valve for predetermined intervals at predetermined times, said timer assembly thereby simulating rainy and dry periods rather than permitting continuous seepage.

5. An apparatus according to claim 4 including means for adjusting the vertical distance between said first valve and said base means.

6. An apparatus according to claim 5 wherein said adjusting means includes a first means for vernier adjustment and second means for coarse adjustment of said vertical distance between said valve and said base means.

7. An apparatus for holding a container and for automatically supplying fluid to said container in a manner which simulates periods of dry and rainy periods comprising: a base plate; a plurality of posts extending upwardly from said base plate, including at least one elongated post that is longer than the other posts; a support plate for holding said container, said support plate slidably mounted to said posts to be guided in the vertical plane as the support plate moves in vertical relative movement to said base plate; spring bias means attached to at least a majority of said posts and to said support plate to initiate upward vertical movement in response to a decrease in a predetermined amount of fluid to be placed in said container; a first valve positioned above said support plate to permit the direct flow of fluid into said container when fluid has passed through said valve, said valve being suitable for connection to a fluid supply conduit actuating means adapted to open said first valve in response to said upward vertical movement of said support plate; an elongated member supporting said first valve and slidably mounted to said elongated post to permit coarse adjustment of the distance between said valve and said base plate; a second valve for connection in series with said first valve in said fluid conduit; a timer assembly operatively connected to said second valve to open said second valve for predetermined intervals at predetermined times, said timer assembly thereby simulating rainy and dry periods rather than permitting continuous seepage.

8. An apparatus according to claim 4 including a vernier adjustment means operatively connected to said first valve to permit fine adjustment of the distance between said first valve and said support plate.

References Cited by the Examiner

UNITED STATES PATENTS

| 1,345,113 | 6/1920 | Andrew | 119—81 |
| 2,472,387 | 6/1949 | Shepherd | 119—81 |
| 2,674,490 | 4/1954 | Richards | 239—70 X |
| 2,821,434 | 1/1958 | Hunter et al. | 239—64 |

FOREIGN PATENTS

| 841,340 | 5/1939 | France. |

OTHER REFERENCES

Publication, Popular Mechanics, August 1949, page 100, "Plants in Hanging Flower Basket Watered Automatically."

ABRAHAM G. STONE, *Primary Examiner.*

J. R. OAKS, *Assistant Examiner.*